United States Patent
Haynes et al.

(10) Patent No.: US 8,340,345 B2
(45) Date of Patent: Dec. 25, 2012

(54) THERMAL AND SHORT WAVELENGTH INFRARED IDENTIFICATION SYSTEMS

(75) Inventors: Derek Haynes, Bonita Springs, FL (US); Stuart M. Jenkins, Bognor Regis (GB); Michael P. Thomas, Peacehaven (GB)

(73) Assignee: Cejay Engineering, LLC, Bonita Springs, FL (US)

( * ) Notice: Subject to any disclaimer, the term of this patent is extended or adjusted under 35 U.S.C. 154(b) by 702 days.

(21) Appl. No.: 12/458,445

(22) Filed: Jul. 13, 2009

(65) Prior Publication Data

US 2011/0007938 A1    Jan. 13, 2011

(51) Int. Cl.
*G06K 9/00* (2006.01)
(52) U.S. Cl. ...................................................... 382/100
(58) Field of Classification Search .................. 382/100, 382/190, 191; 348/135, 143, 148, 161, 162, 348/164; 341/110, 143, 173; 342/58, 60; 375/134, 145, 149, 150; 380/54
See application file for complete search history.

(56) References Cited

U.S. PATENT DOCUMENTS

| | | | | |
|---|---|---|---|---|
| 5,005,213 A * | 4/1991 | Hanson et al. | ................ | 398/119 |
| 5,280,287 A * | 1/1994 | Evans | ............. | 342/45 |
| 5,648,862 A * | 7/1997 | Owen | ............. | 398/128 |
| 2002/0085097 A1* | 7/2002 | Colmenarez et al. | ......... | 348/211 |
| 2008/0198039 A1* | 8/2008 | Philiben | ........................ | 340/961 |
| 2009/0081619 A1* | 3/2009 | Miasnik | ........................ | 434/21 |

OTHER PUBLICATIONS

Extended European Search Report No. 10251244.9-1248/2275831 dated Dec. 19, 2011, 6 pages.

\* cited by examiner

*Primary Examiner* — Chan S Park
*Assistant Examiner* — Shervin Nakhjavan
(74) *Attorney, Agent, or Firm* — Finnegan, Henderson, Farabow, Garrett & Dunner, LLP

(57) ABSTRACT

A method and apparatus for preventing fratricide including an emitter that emits a signaling code at a wavelength, the signaling code representing a coded message; a receiver that captures an image of a field of view including the emitter and generates image information corresponding to the captured image; a translation system that: receives the image information, and decodes the coded message from the image information; and a output device that outputs the decoded message.

20 Claims, 5 Drawing Sheets

THERMAL AND SHORT WAVELENGTH INFRARED IDENTIFICATION SYSTEMS

BRIEF DESCRIPTION

1. Technical Field

The present invention is related to identification systems and, more particularly, to thermal and short wavelength infrared identification systems.

2. Background

The inability of reconnaissance to distinguish between friend or foe in low light or total darkness is a major failing of battlefield and law enforcement operations. In these types of lighting conditions, not only does the probability of fratricide (the inadvertent killing of friendly forces by other friendly forces) increase, but time and resources are wasted during attempts to confirm identification. Furthermore, during the heat of battle, mistakes in identification are more likely to occur. Accordingly, there is a need to facilitate effortless and accurate nighttime identification and classification of a distant target or location by a remote sensor.

To this end, night vision equipment including light-intensifying systems that operate by amplifying visible and near infrared light may be used in conjunction with a beacon which emits unique flashing infrared signatures. These flashing infrared signatures are invisible to the naked eye and are distinguished from operational surroundings by means of an intense concentrated energy pulse, coupled with a unique flashing sequence, referred to as the signaling code of the beacon. When viewed through night vision equipment, the beacon signature cuts through fog, smoke and darkness. However, when one views a battlefield scene through night vision equipment there may be a significant amount of clutter due to operational surrounding such as, for example, gun or tracer fire. Accordingly, it may be difficult for an individual to distinguish between flashes generated by operational surroundings and a signaling code generated by the beacon.

Military and law enforcement personnel have relied on this conventional night vision equipment operating in wavelengths of below 900 nanometers to distinguish between friend or foe. Over a period of time, however, enemy forces have acquired compatible night vision devices and captured various types of identification beacons provided to friendly forces. As a consequence, the enemy is able to identify and target friendly forces.

For these reasons, there is a need to provide an alternate solution to prevent fratricide by distinguishing friend from foe while maintaining the stealth and security of allied forces from detection by the enemy.

BRIEF SUMMARY

Consistent with the present invention, there is provided an antifratricide system comprising a receiver that captures an image of a field of view including an emitter and generates image information corresponding to the captured image; a translation system that: receives the image information, and decodes the coded message from the image information; and an output device that presents the decoded message.

Consistent with the present invention, there is also provided an antifratricide system comprising an emitter that emits a signaling code at a wavelength, the signaling code representing a coded message; a receiver that captures an image of a field of view including the emitter and generates image information corresponding to the captured image; a translation system that: receives the image information, and decodes the coded message from the image information; and an output device that outputs the decoded message.

Consistent with the present invention, there is also provided a method for preventing fratricide, the method comprising emitting a signaling code from a source of electromagnetic energy at a wavelength, the signaling code representing a coded message; capturing an image of a field of view including the source of electromagnetic energy; generating image information from the captured image; detecting the signaling code in the image information; analyzing the image information to decode the coded message; and presenting the decoded message to a user.

Consistent with the present invention, there is also provided a computer-implemented translation system comprising a look-up database including signaling code translation values and corresponding alphanumeric characters; and a processor that operates a decoder module including instructions for performing a method. The method comprises detecting a signaling code in image information corresponding to an image of a field of view comparing the detected signaling code to the signaling code translation values in the look-up database, determining whether the detected signaling code matches one or more of the signaling code translation values to generate a code match, decoding the coded message by determining the alphanumeric character associated with the code match; and storing the decoded message.

It is to be understood that both the foregoing general description and the following detailed description are exemplary and explanatory only and are not restrictive of the invention, as claimed.

The accompanying drawings, which are incorporated in and constitute a part of this specification, illustrate embodiments consistent with the invention and together with the description, serve to explain the principles of the invention.

DETAILED DESCRIPTION

Reference will now be made in detail to the exemplary embodiments consistent with the present invention. Wherever possible, the same reference numbers will be used throughout the drawings to refer to the same or like parts. It is apparent, however, that the embodiments shown in the accompanying drawings are not limiting, and that modifications may be made without departing from the spirit and scope of the invention.

Systems and methods consistent with the invention provide an antifratricide system. To this end, the antifratricide system may include an emitter, a receiver, and an identification system. The emitter may emit a signaling code at a specific wavelength which is received by the receiver and transmitted to the identification system. In turn, the identification system may analyze the signaling code and translate the signaling code into alphanumeric characters. The antifratricide system may then generate an antifratricide display that graphically or pictorially displays the alphanumeric characters associated with the translated signaling code in relation to the emitter.

Figure 1:
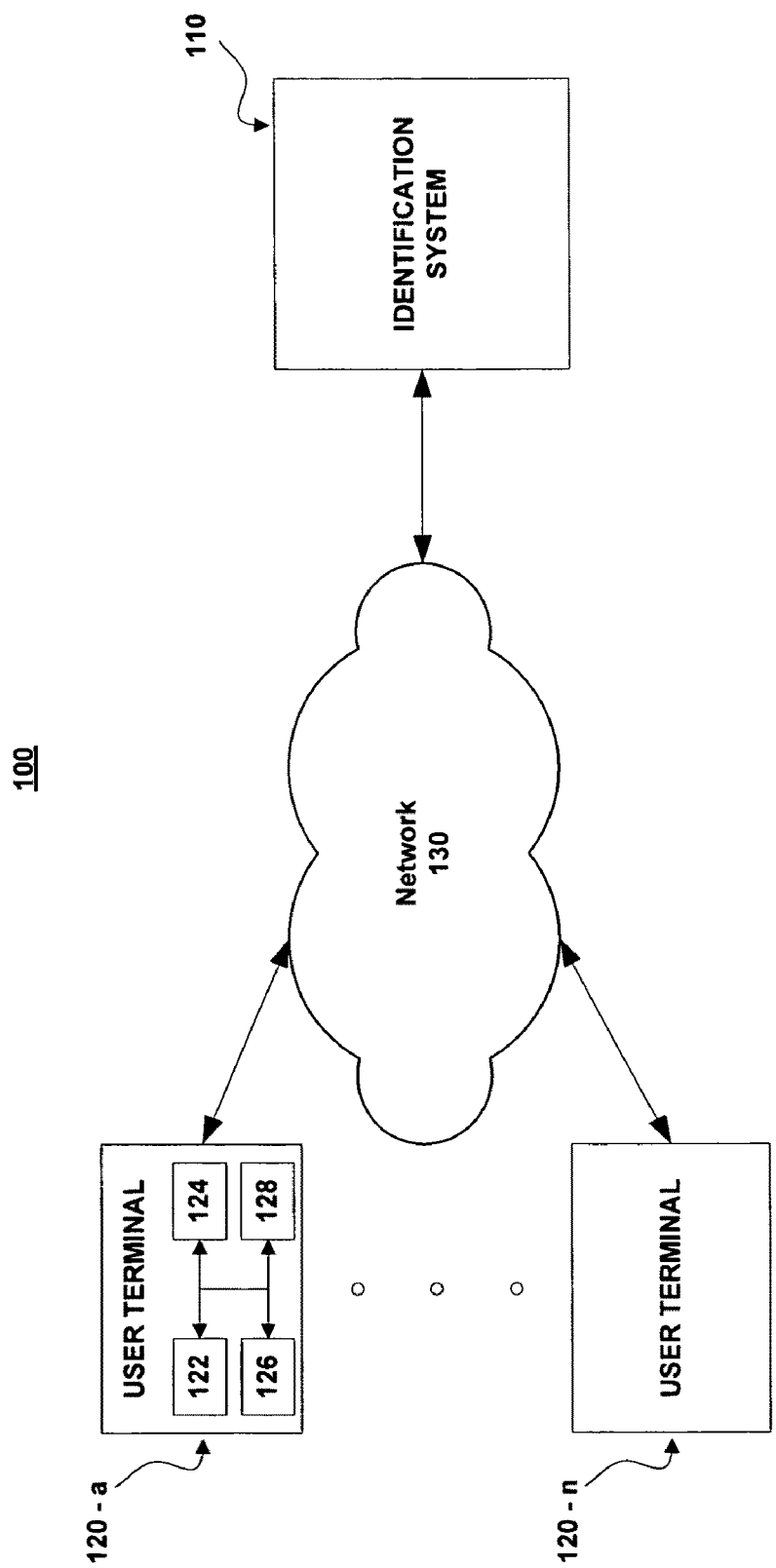
FIG. 1 is a block diagram of an exemplary antifratricide system consistent with the present invention.

FIG. 1 is a block diagram of an exemplary antifratricide system 100 consistent with the present invention. One skilled in the art will appreciate that system 100 may be implemented in a number of different configurations without departing from the scope of the present invention. In the embodiment shown in FIG. 1, system 100 may include an identification system 110, a plurality of user terminals 120-a to 120-n, and a network 130 for connecting identification system 110 with terminals 120. While FIG. 1 shows only one identification system 110 and two terminals 120, system 100 may include any number of systems 110 and terminals 120.

Identification system 110 may include an emitter, a receiver, and a translation system that performs various functions. In one embodiment, system 110 may be configured to process character image patterns using a vision analysis recognition algorithm microcode and transmit the recognized patterns to one or more of terminals 120-a to 120-n to provide friend-or-foe information associated with the signaling code, such as an alphanumeric character. The functions performed by identification system 110 are described in greater detail below with respect to, for example, FIGS. 2 to 5.

Each user terminal 120 may be a computing system operated by a user, and may be sized and dimensioned so as to be man-portable. Terminal 120 may be used to display information associated with the translation system. As shown in FIG. 1 (for simplicity, in terminal 120-a only), user terminal 120 may include, for example, a processor 122, a memory 124, an output device 126, and an interface device 128. Processor 122 may be one or more processor devices, such as a microprocessor, personal digital assistant (PDA), laptop computer, desktop computer, workstation, mainframe computer, and the like that execute program instructions to perform various functions. Memory 124 may be one or more storage devices that maintain data (e.g., instructions, software applications, etc.) used by processor 122. Output device 126 may be any known type of output device that presents information to the user operating terminals 120-a to 120-n, such as a liquid crystal display (LCD) screen, a speaker, or an indicator display. Interface device 128 may be one or more known interface device modules that facilitate the exchange of data between the internal components of user terminals 120-a to 120-n and external components, such as identification system 110. In addition, interface device 128 may include a network interface device that allows user terminals 120-a to 120-n to receive and send data to and from network 130.

Network 130 may be any type of network that facilitates communication between remote components, such as identification system 110 and user terminals 120a-n. For example, network 130 may be a local area network (LAN), a wide area network (WAN), a virtual private network, a dedicated intranet, the Internet, and/or a wireless network.

The arrangement illustrated in FIG. 1 is exemplary and system 100 may be implemented in a number of different configurations without departing from the scope of the present invention. For example, components 110 and 120 may be directly connected, as opposed to being connected via network 130. Further, additional components may be included in system 100, such as a connection to other antifratricide systems that may provide information to identification system 110. In addition, one or more terminals 120 may be included within system 110, thus allowing system 110 to display information itself.

Figure 2:
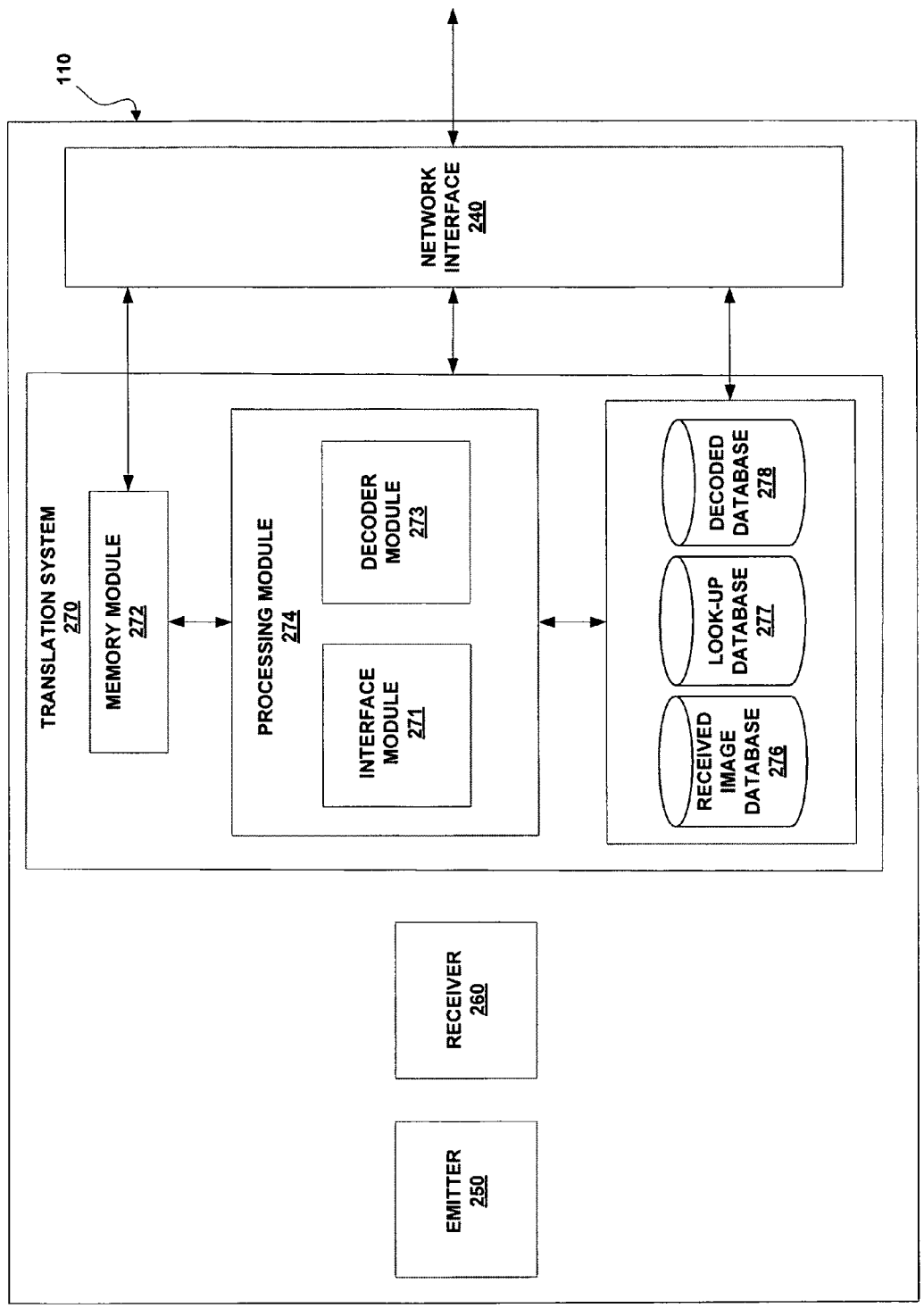
FIG. 2 is a block diagram of an exemplary embodiment of an identification system.

Referring now to FIG. 2, there is shown a block diagram of an exemplary embodiment of identification system 110. As shown in FIG. 2, identification system 110 may further include a network interface 240, an emitter 250, a receiver 260, and a translation system 270.

Network interface 240 may be one or more devices that facilitate the transfer of information between identification system 110 and external components, such as user terminals 120. Network interface module 240 may also receive information from emitter 250 and/or receiver 260 and route those requests to translation system 270. In some exemplary embodiments, network interface module 240 may be a server that receives information from emitter 250 and/or receiver 260, forwards the information to translation system 270, and transmits the outputted information to one or more of user terminals 120a-n.

Emitter 250 may be one or more devices that emit electromagnetic energy at a selected or range of frequencies and which can be made to flash in a specific sequence or pattern to generate a covert signaling code. For example, emitter 250 may be a programmable infrared beacon which may include one or more infrared LEDs and a storage device that stores coded messages such as "USA" in Morse Code, a single letter in Morse Code, or any other type of coded message. While the emitter can operate in a selected frequency or range of frequencies, the emitter preferably emits the signaling code in the wavelength of between 950 nanometers to 12 microns in an effort to avoid night vision devices that have been captured by enemy forces. An exemplary embodiment of such an emitter 250 is described in, for example, U.S. Pat. No. 7,456,754.

Receiver 260 may be one or more devices configured to detect images and receive the signaling code from emitter 250. For example, receiver 260 may include one or more cameras such as an Electron Multiplying Charge Coupled Device (low light gas camera) and/or thermal cameras that detect images of a field of view including the emitter and, in those images, further detect signal information representing the signaling code emitted by emitter 250. Examples of acceptable commercially available thermal cameras include FLIR's 4700/4800 series thermal cameras, although other types of cameras made by other manufacturers may also be used in lieu of or in addition to FLIR's 4700/4800 series thermal cameras. Receiver 260 then transmits to translation system 270 image information representing one or more images containing the signaling code.

Translation system 270 may include one or more interconnected modules and databases, such as, for example, a memory module 272, a processing module 274, a received image database 276, a look-up database 277, and a decoded database 278. Memory module 272 may represent one or more storage devices that maintain information that is used by processing module 274 and/or other components internal and external to identification system 110. Further, memory module 272 may include one or more programs that, when executed by an entity of processing module 274, perform one or more processes consistent with embodiments of the present invention. Examples of such processes are described in greater detail below, with respect to FIGS. 3-5. Memory module 272 may also include configuration data that may be used by processing module 274 to present configured alphanumeric information derived from the received images to user terminals 120 and data regarding the selected frequency or range of frequencies emitted by friendly emitters. Examples of such configured alphanumeric information are described in greater detail with respect to FIG. 5.

Processing module 274, as shown in FIG. 2, may further include an interface module 271 and a decoder module 273. Interface module 271 may include components for receiving the image information from receiver 260 and outputting information generated by processing module 274 via network interface 240. Decoder module 273 may include components for extracting signal information from the image information received from the receiver and decoding the signal information into the signal code for output as, for example, alphanumeric information. As described in more detail below, decoder module 273 may retrieve and process data from one or more of modules 271 and 272 and/or databases 276, 277, and 278 (described below) to decode received image information and to generate alphanumeric information for transmission to terminals 120 via network interface 240.

As shown in FIG. 2, identification system 110 may also include a plurality of interconnected databases 276, 277, and 278. In this regard, identification system 110 may include a database module (not shown) having components for controlling access to databases 276, 277, and 278. Databases 276, 277, and 278 may be configured using any appropriate type of known storage system configuration that facilitates the storage of data, as well as the locating, accessing, and retrieving of data stored in the databases (e.g., Sybase, Oracle, MySQL, SQL, C++, Access, etc. databases).

The arrangement illustrated in FIG. 2 is exemplary and identification system 110 may be implemented in a number of different configurations without departing from the scope of the present invention. For example, while in the embodiment shown in FIG. 2 the databases are interconnected, each database need not be interconnected. Moreover, rather than separate databases, identification system 110 may include only one database that would include the data of databases 276, 277, and 278. In addition, components 250 and/or 260 could be included within translation system 270 itself. Furthermore, the identification system may include other components such as, for example, a power pack (not shown). The power pack could be included in a variety of configurations, such as within the receiver 260 or as a stand alone unit.

Figure 3:
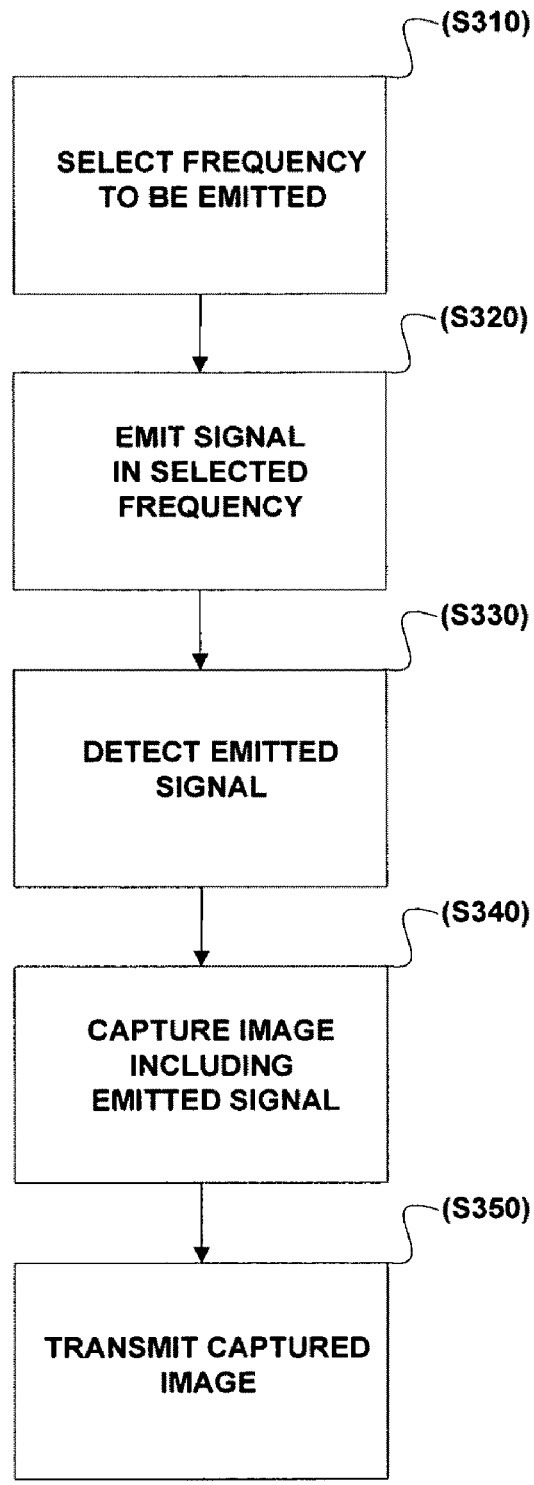
FIG. 3 is a flowchart demonstrating an exemplary process used in the antifratricide system of FIG. 1.

FIG. 3 is a flowchart demonstrating an exemplary process used in the antifratricide system 100 consistent with the present invention. For example, system 100 may use the process of FIG. 3 to detect whether an individual is a friend or a foe. As shown in FIG. 3, the process may begin by selecting a frequency or range of frequencies to be emitted by the emitter 250 (S310). The frequency or frequencies selected can be any appropriate frequency, but is preferably between 950 nanometers and 12 microns so as to avoid detection by enemy forces that have acquired conventional night vision equipment. Although not shown in FIG. 3, a time interval may also be selected in which the emitter emits the frequency or frequencies at discrete short time intervals. Selecting this time interval may reduce the power required to drive the emitter and may also allow the conditions of the emitter to be better controlled, thus making the signaling code more consistent, regardless of the selected emitter technology.

Subsequently, the emitter 250 may emit a signaling code in the selected frequency or range of frequencies (S320) which may received by receiver 260 (S330). Receiver 260 may be configured to amplify signatures that are emitted in the selected frequency or range of frequencies to generate a stronger image of an emitter in an image field of view. In particular, an image of a field of view including the emitter is captured (S340) and transmitted by receiver 260 (S350) to translation system 270. The signaling code may relate to a coded message, and the image may be in the form of continuous video, slow-scan video, a burst of still images, or any other appropriate type of image.

Figure 4:
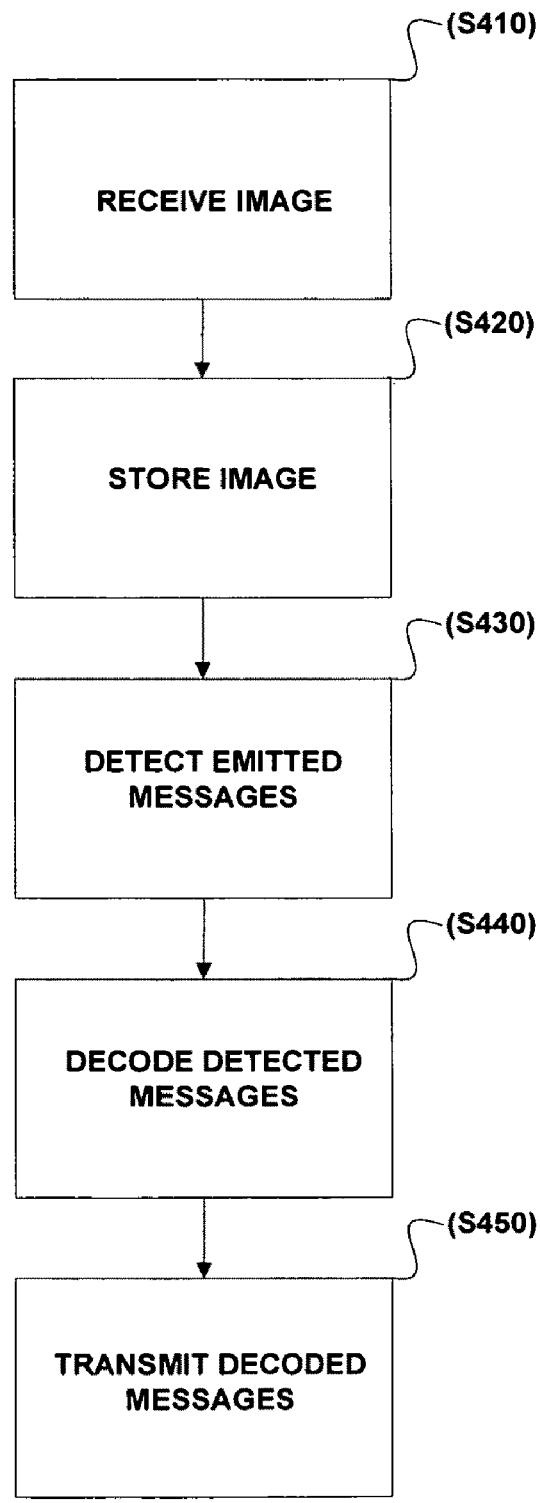
FIG. 4 is a flowchart demonstrating an exemplary process used in the antifratricide system of FIG. 1.

FIG. 4 is a flowchart demonstrating an exemplary process used in the antifratricide system 100 consistent with the present invention. For example, system 100 may use the process of FIG. 4 to receive signaling code from a beacon indicating whether a force is a friend or a foe and translate the signaling code into alphanumeric characters which a user can easily understand. As shown in FIG. 4, the interface module 271 of the translation system 270 may receive information of images captured by receiver 260 (S410) and may store the images in the received images database 276 (S420).

After the images are stored, the processing module 274 of the translation system 270 may retrieve the stored images and analyze them using a vision analysis recognition algorithm programmed in, for example, microcode (S430). Vision analysis microcode has been employed in a number of industries, such as in the area of video arcade software.

In particular, the decoder module 273 of the processing module 274 may include vision analysis recognition algorithm microcode that detects signaling code, such as flashes, emitted by the emitter. The decoder module 273 may also adaptively differentiate between flashes generated by the emitter and those generated by operational conditions such as gunfire. For example, the decoder module 273 may detect each flash within the images and determine whether the flashes are random or are repeating at particular time intervals (such as, for example, every 10 seconds). The decoder module 273 may determine that the flashes that are random may be considered simply as operational conditions, such as gunfire, and thus can be ignored. Similarly, the decoder module 273 may determine that the repeating flashes are signaling code. Furthermore, the decoder module 273 may also distinguish between beacons emitting at the selected emitting frequency, that is, the IR "color," and those emitting at other frequencies. For example, the memory module 272 may include stored frequency data that corresponds to the wavelength at which the signaling code is emitted. Decoder module 273 may access the stored frequency data and compare it to the wavelength of the signaling code.

After the signaling code has been detected, decoder module 273 translates the signaling code into alphanumeric characters to be displayed by one or more of user terminals 120 (S440). To translate the signaling code, the decoder module 273 searches look-up database 277 to determine whether the detected signaling code matches signaling code translation values stored in look-up database 277. The signaling code translation values may include information that associates various signaling codes with one or more alphanumeric characters. If look-up database 277 includes the detected signaling code, the information associated therewith is translated and stored in decoded database 278. For example, if the visional analysis recognition algorithm microcode detects the signaling code "SHORT SHORT LONG," the decoder module 273 searches through look-up database 277 for "SHORT SHORT LONG" and determines the associated alphanumeric character to decode the signal. While in some embodiments the signaling code is translated into alphanumeric characters, the signaling code may be associated with and thus translated into a variety of types of information such as, for example, symbols, colors, sounds, pictures, or the like.

Figure 5:
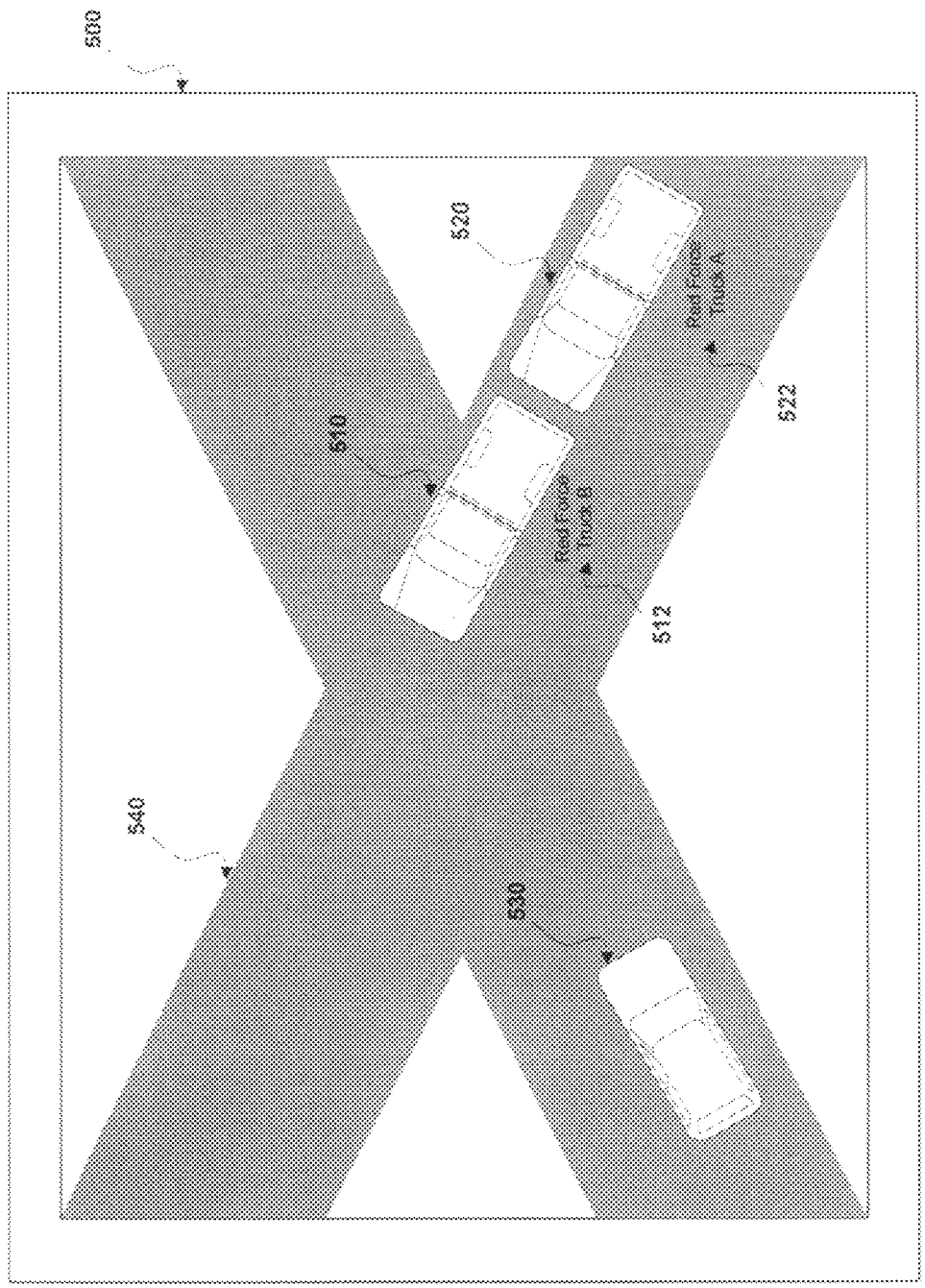
FIG. 5 is an exemplary antifratricide display.

After decoding the signal, interface module 271 of processing module 274 may transmit the decoded signaling code to client terminal(s) 120 for display (S450) in an antifratricide display 500. FIG. 5 illustrates an exemplary antifratricide display 500 for displaying signaling codes decoded by identification system 110. As shown in FIG. 5, antifratricide display 500 may graphically depict the decoded signaling code in a way that aids an individual in quickly and accurately determining whether an individual or object is a friend or a foe. For example, as shown in FIG. 5, antifratricide display 500 may include one or more images captured by receiver 260, including real-time images. In the exemplary implementation shown in FIG. 5, three vehicles (510, 520, 530) traveling on a road 540 are captured by receiver 260 and displayed on antifratricide display 500. In addition, the decoded signaling codes may be overlaid on the image to identify each of the vehicles for which there was decoded information.

In the embodiment shown in FIG. 5, vehicles 510 and 520 include beacons that emit signaling codes indicating that they are members of the red force, as well as indicating the name of the particular vehicle. Here, the decoded signaling code "Red Force Truck B" 512 corresponding to the signaling code emitted by vehicle 510 is overlaid on the image to be adjacent to vehicle 510. Similarly, the decoded signaling code "Red Force Truck A" 522 corresponding to the signaling code emitted by vehicle 520 is overlaid on the image adjacent to vehicle 520. As shown in FIG. 5, vehicle 530 does not include a decoded signaling code overlaid over the image. This may indicate to the user of the antifratricide display that the receiver 260 did not detect and/or the translation unit 271 did not translate a detected signaling code. Accordingly, the user may determine that vehicle 530 is likely a foe, rather than a friend.

As described above, systems and methods consistent with the invention provide an antifratricide system that aids a user in distinguishing between friend and foe. For purposes of explanation only, certain aspects and embodiments are described herein with reference to the components illustrated in FIGS. 1-5. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects, and principles of the present invention may be implemented in various environments and are not limited to the illustrated environments.

Further, the sequences of events described in FIGS. 1-5 are exemplary and not intended to be limiting. Thus, other process stages may be used, and even with the processes depicted in FIGS. 1-5, the particular order of events may vary without departing from the scope of the present invention. Moreover, certain process stages may not be present and additional stages may be implemented in FIGS. 1-5. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An antifratricide system comprising:
an emitter that emits a signaling code at a wavelength, the signaling code representing a coded message;
a receiver that captures an image of a field of view including the emitter and generates image information corresponding to the captured image;
a translation system comprising:
a look-up database including signaling code translation values and corresponding alphanumeric characters;
a processor coupled to the look-up database; and
a decoder module operated by the processor, the decoder module
receiving the image information,
detecting the signaling code in the image information, and
decoding the coded message from the image information, wherein decoding the coded message includes:
comparing the detected signaling code to the signaling code translation values in the look-up database,
determining whether the detected signaling code matches one or more of the signaling code translation values to generate a code match,
determining the alphanumeric character associated with the code match to decode the coded message, and
storing the decoded message; and
an output device that outputs the decoded message to a user,
wherein the translation system analyzes the image information to determine the wavelength of electromagnetic energy generated by the emitter, and
wherein the decoder module decodes the coded message only if the determined wavelength corresponds to a predetermined wavelength.

2. The antifratricide system of claim 1, further comprising:
a memory module including stored frequency data corresponding to the predetermined wavelength, and
wherein the translation system determines whether the determined wavelength corresponds to the predetermined wavelength by comparing the determined wavelength to the stored frequency data and determining whether the determined wavelength matches the stored frequency data.

3. The antifratricide system of claim 1, wherein the output device outputs the decoded message by:
displaying the image of the field of view, and
displaying the decoded message overlaid on a portion of the field of view image corresponding to the position of the emitter.

4. The antifratricide system of claim 1, wherein:
the signaling code comprises a series of bursts of electromagnetic energy, and
the signaling code corresponds to one or more alphanumeric characters.

5. The antifratricide system of claim 1, wherein the predetermined wavelength is between 950 nanometers and 12 microns.

6. The antifratricide system of claim 1, wherein the receiver comprises a thermal camera that captures a plurality of images of the field of view.

7. A method for preventing fratricide, the method comprising:
emitting a signaling code from a source of electromagnetic energy at a wavelength, the signaling code representing a coded message;
capturing an image of a field of view including the source of electromagnetic energy;
generating image information from the captured image;
detecting the signaling code in the image information;
analyzing the image information to decode the coded message, wherein the analyzing the image information to detect the signaling code comprises:
storing signaling code translation values and corresponding alphanumeric characters in a look-up database;
comparing the detected signaling code to the signaling code translation values in the look-up database;
determining whether the detected signaling code matches one or more of the signaling code translation values to generate a code match;

determining whether the wavelength of the source of electromagnetic energy corresponds to a predetermined wavelength;

determining the alphanumeric character associated with the code match to decode the coded message, wherein the coded message is only decoded if the wavelength of the source of electromagnetic energy corresponds to the predetermined wavelength; and storing the decoded message; and presenting the decoded message to a user.

8. The method of claim 7, further comprising:

storing frequency data corresponding to the predetermined wavelength, and wherein determining whether the wavelength of the source of electromagnetic energy corresponds to a predetermined wavelength comprises determining whether the whether the wavelength of the source of electromagnetic energy matches the stored frequency data.

9. The method of claim 7, wherein presenting the decoded message comprises overlaying the decoded message on a displayed image of the field of view, the decoded message being overlaid on a portion of the field of view image that corresponds to the position of the source of electromagnetic energy.

10. The method of claim 7, wherein the signaling code comprises a series of bursts of electromagnetic energy, and the signaling code corresponds to one or more alphanumeric characters.

11. The method of claim 7, wherein the wavelength is in the range of between 950 nanometers and 12 microns.

12. The method of claim 7, wherein capturing the field of view image comprises capturing a plurality of images by a thermal camera.

13. A computer-implemented translation system comprising:

a look-up database including signaling code translation values and corresponding alphanumeric characters; and a processor that operates a decoder module including instructions for performing a method, the method comprising:

detecting a signaling code in image information corresponding to an image of a field of view, comparing the detected signaling code to the signaling code translation values in the look-up database, determining whether the detected signaling code matches one or more of the signaling code translation values to generate a code match, analyzing the image information to determine a wavelength of electromagnetic energy generated by an emitter;

decoding the coded message by determining the alphanumeric character associated with the code match only if the determined wavelength corresponds to a predetermined wavelength; and storing the decoded message.

14. The computer-implemented translation system of claim 13, the method further comprising outputting the decoded message only if the determined wavelength corresponds to a predetermined wavelength.

15. The computer-implemented translation system of claim 14, wherein outputting the decoded message comprises:

displaying an image of a field of view captured by a receiver; and displaying the decoded message overload on a portion of the image of the field of view corresponding to a position of the emitter.

16. The computer-implemented translation system of claim 13, wherein:

the signaling code comprises a series of bursts of electromagnetic energy, and the signaling code corresponds to one or more alphanumeric characters.

17. The computer-implemented translation system of claim 13, wherein the predetermined wavelength is between 950 nanometers and 12 microns.

18. An antifratricide system comprising:

a receiver that:

captures an image of a field of view including an emitter transmitting a coded message, and generates image information corresponding to the captured image;

a translation system that receives the image information, and decodes the coded message from the image information, the translation system comprising:

a look-up database including signaling code translation values and corresponding alphanumeric characters;

a processor coupled to the look-up database; and a decoder module operated by the processor, the decoder module comparing the coded message to the signaling code translation values in the look-up database, determining whether the coded message matches one or more of the signaling code translation values to generate a code match, determining the alphanumeric character associated with the code match to decode the coded message, and storing the decoded message an output device that presents the decoded message to a user, wherein the translation system analyzes the image information to determine the wavelength of electromagnetic energy generated by the emitter, and wherein the decoder module decodes the coded message only if the determined wavelength corresponds to a predetermined wavelength.

19. The antifratricide system of claim 18, wherein the predetermined wavelength is between 950 nanometers and 12 microns.

20. The antifratricide system of claim 18, the translation system further comprising:

a memory module including stored frequency data corresponding to the predetermined wavelength, and wherein the translation system determines whether the determined wavelength corresponds to the predetermined wavelength by comparing the determined wavelength to the stored frequency data and determining whether the determined wavelength matches the stored frequency data.

* * * * *